United States Patent
Caldwell (12)

(10) Patent No.: US 10,730,141 B2
(45) Date of Patent: Aug. 4, 2020

(54) OPTICAL FEEDBACK SIGNAL COMPENSATION FOR BACKGROUND INFRARED RADIATION IN A LASER CHAMBER

(71) Applicant: Branson Ultrasonics Corporation, Danbury, CT (US)

(72) Inventor: Scott Caldwell, New Milford, CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 225 days.

(21) Appl. No.: 15/910,173

(22) Filed: Mar. 2, 2018

(65) Prior Publication Data

US 2018/0290236 A1    Oct. 11, 2018

Related U.S. Application Data

(60) Provisional application No. 62/482,714, filed on Apr. 7, 2017.

(51) Int. Cl.
| | |
|---|---|
| *B23K 26/02* | (2014.01) |
| *B23K 26/04* | (2014.01) |
| *B23K 26/06* | (2014.01) |
| *B23K 26/21* | (2014.01) |
| *B29C 65/16* | (2006.01) |

(Continued)

(52) U.S. Cl.
CPC .......... *B23K 26/0626* (2013.01); *B23K 26/21* (2015.10); *B23K 26/705* (2015.10); *B29C 65/1612* (2013.01); *B29C 65/1635* (2013.01); *B29C 65/1687* (2013.01); *B29C 66/1122* (2013.01); *B29C 66/41* (2013.01); *B29C 66/872* (2013.01); *B29C 66/9131* (2013.01); *B29C 66/9161* (2013.01); *B29C 66/961* (2013.01); *B29C 65/168* (2013.01); *B29C 65/1674* (2013.01)

(58) Field of Classification Search
CPC .. B23K 26/0626; B23K 26/21; B23K 26/705; B29C 65/1612; B29C 65/1635; B29C 65/1674; B29C 65/168; B29C 65/1687; B29C 66/1122; B29C 66/41; B29C 66/872; B29C 66/9131; B29C 66/9161; B29C 66/961
USPC .......................................... 219/121.6–121.83
See application file for complete search history.

(56) References Cited

U.S. PATENT DOCUMENTS

| | | | | |
|---|---|---|---|---|
| 2007/0265726 A1* | 11/2007 | Caldwell | ................ | B23K 26/04 700/166 |
| 2008/0194969 A1* | 8/2008 | Werahera | ............. | A61B 5/0059 600/476 |
| 2011/0203924 A1* | 8/2011 | Wohlstadter | .......... | B01L 3/5085 204/403.01 |

\* cited by examiner

*Primary Examiner* — Sang Y Paik
(74) *Attorney, Agent, or Firm* — Harness, Dickey & Pierce, P.L.C.

(57) ABSTRACT

Plastic parts are welded in a laser welding system. An infrared laser source in a laser chamber is controlled by a controller using closed-loop feedback control with a corrected feedback signal that is compensated for background infrared radiation in the laser chamber. Prior to the infrared laser source being turned on, the controller senses with the optical sensor an intensity of background infrared radiation in the laser chamber. Once the laser is on, the controller senses with the optical sensor an intensity of infrared laser radiation in the laser chamber. The controller calculates the corrected feedback signal by subtracting the intensity of the background infrared radiation sensed when the infrared laser source was off from the intensity of the infrared laser radiation sensed when the infrared laser source is on.

9 Claims, 3 Drawing Sheets

(51) Int. Cl.
*B29C 65/00* (2006.01)
*B23K 26/70* (2014.01)

OPTICAL FEEDBACK SIGNAL COMPENSATION FOR BACKGROUND INFRARED RADIATION IN A LASER CHAMBER

CROSS-REFERENCE TO RELATED APPLICATIONS

This application claims the benefit of U.S. Provisional Application No. 62/482,714 filed on Apr. 7, 2017. The entire disclosure of the above application is incorporated herein by reference.

FIELD

The present disclosure relates to laser welding.

BACKGROUND

This section provides background information related to the present disclosure which is not necessarily prior art.

Laser welding is commonly used to weld plastic parts together. Two known techniques are trace laser welding and simultaneous laser welding. In trace laser welding, a spot laser tracks a weld path by movement of the laser device and/or laser beam, work piece, or a combination thereof. The weld path is where the two parts are welded together at a weld interface and may for example be a line extending adjacent a periphery of the parts. In simultaneous laser welding, the full weld path or area (referred to herein as the weld path) is simultaneously exposed to laser light, such as through a coordinated alignment of a plurality of laser light sources, such as laser diodes or through an optical waveguide. In an example of simultaneous laser welding, the laser light is transmitted from a plurality of laser light sources, such as laser diodes, to the parts being welded through one or more optical waveguides which conform to the contours of the parts' surfaces being joined along the weld path.

In both trace laser welding systems and simultaneous laser welding systems, the lasers are often controlled using closed loop feedback. A closed loop feedback control system for a through transmissive infrared ("TTIr") laser welding system is disclosed in U.S. Pat. No. 7,343,218 for Automatic Part Feedback Compensation for Laser Plastics Welding that is commonly owned with present application. The entire disclosure of U.S. Pat. No. 7,343,218 is incorporated herein by reference. FIGS. 2 and 4 of U.S. Pat. No. 7,343,218 are included herein as FIGS. 1 and 2. Referring FIG. 1, a feedback control system 10 is employed to provide feedback information in a TTIr laser welding system 11 to monitor the intensity of laser light downstream from an infrared laser source 14. Feedback control system 10 comprises an optical sensor 16 that senses infrared radiation that is positioned downstream from laser source 14, yet upstream from plastic parts 22, 24 that are received in laser welding system 11 in abutting relation to each other. Plastic part 22 is illustratively a transmissive plastic part 22 and a plastic part 24 is illustratively an absorptive plastic part that is at least partially absorptive to laser light emitted laser source 14 and a controller 17. It should be understood that plastic part 24 can be made of a material that is at least partially absorptive the laser light, the absorptivity provided by an absorptive weld additive placed at a weld interface between plastic parts 22, 24, or both. In an example, laser source 14 is an infrared laser diode and optical sensor 16 is a photodiode. Controller 17 is coupled to optical sensor 16 and receives from optical sensor 16 on a real-time basis infrared radiation intensity senses by optical sensor 16 due to the intensity of the laser light from laser source 14. Controller 17 is coupled to laser source 14 and controls an output intensity of laser source 14.

In some cases, optical sensor 16 can be positioned upstream of a fiber optic member 18 and/or a waveguide 20, or can be positioned downstream of one or more of fiber optic members 18 and waveguide 20. In other words, optical sensor 16 can be positioned at any position between laser source 14 and part 22.

In some laser welding systems, optical sensor 16 is situated to sense intensity of infrared radiation in a laser chamber in which laser source 14 is situated. As shown in FIG. 2, laser source 14 is situated in a laser chamber 26. Optical sensor 16 senses the intensity of infrared radiation in laser chamber 26 to sense the intensity of laser light that is provided by laser source 14. In the example of FIG. 2 laser source 14 is a laser diode, optical sensor 16 is a photodiode and laser chamber 26 is a laser diode chamber.

A difficulty in sensing in a laser chamber the intensity of laser light that is provided by laser source 14 by sensing the intensity of infrared radiation in the laser chamber is due to background infrared radiation in the laser chamber. That is, an incidental effect of the laser source emitting laser light is that the body of the laser chamber, the air in it and the components in it are heated by the laser light as laser light impinges upon the body of the laser chamber. The heated body of the laser chamber, the heated air in the laser chamber, and the heated components in the chamber emit the background infrared radiation. This background infrared radiation can cause the reading of the optical sensor to be too high, that is, higher than the intensity of the laser light emitted by laser source 14, as the intensity of infrared radiation in the laser chamber sensed by the optical sensor is the sum of the intensity of infrared radiation from the laser light emitted by the laser source and the intensity of the background infrared radiation.

It is an object of the present invention to correct for background infrared radiation in a laser chamber in a closed loop feedback control system for a laser welding system.

SUMMARY

This section provides a general summary of the disclosure, and is not a comprehensive disclosure of its full scope or all of its features.

In accordance with an aspect of the present disclosure, plastic parts are welded in a laser welding system. The laser welding system has an infrared laser source situated in a laser chamber of the laser welding system. The infrared laser source is controlled by a controller that uses closed-loop feedback control having a feedback signal. The laser welding system includes an optical sensor situated to sense infrared radiation in the laser chamber. Prior to the infrared laser source being turned on, the controller senses with the optical sensor an intensity of background infrared radiation in the laser chamber. Once the controller turns the laser source on, the controller senses with the optical sensor an intensity of infrared radiation in the laser chamber and calculates a corrected feedback signal by subtracting the sensed intensity of the background infrared radiation in the laser chamber when the infrared laser source was off from the sensed intensity of the infrared radiation when the laser source is on. The controller controls an intensity of the infrared laser source when the infrared laser source is on with closed-loop feedback control using the corrected feedback signal as the feedback signal for the closed-loop feedback control.

In an aspect, each time the infrared laser source is to be turned on, the controller senses with the optical sensor the intensity of background infrared radiation in the laser chamber just before the infrared laser source is turned on.

In an aspect, each time the infrared laser source is to be turned on, the controller senses with the optical sensor the intensity of background infrared radiation in the laser chamber within a time period before the infrared laser source is turned on wherein the time period is equal to a time period that the infrared laser source is off between when the infrared laser source is turned off in a weld cycle and turned on in a next weld cycle when the laser welding system is running serial production.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
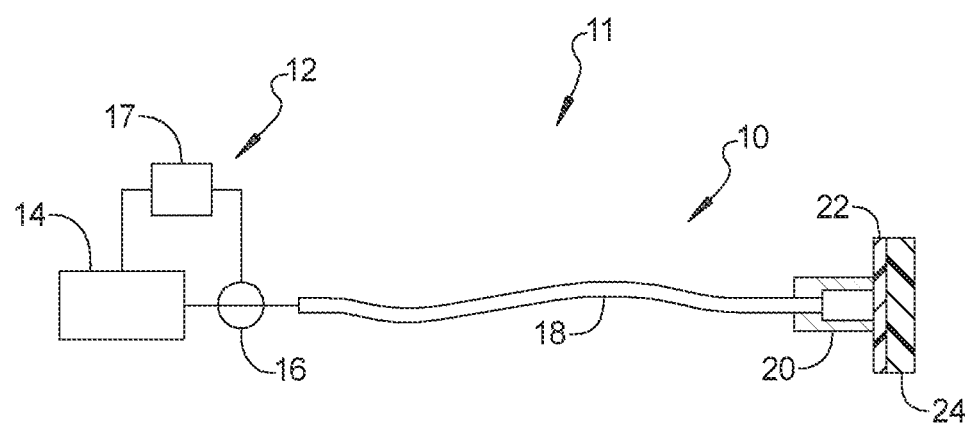
FIG. 1 is a schematic view illustrating a prior art through transmissive infrared welding system using closed-loop feedback control.
Figure 2:
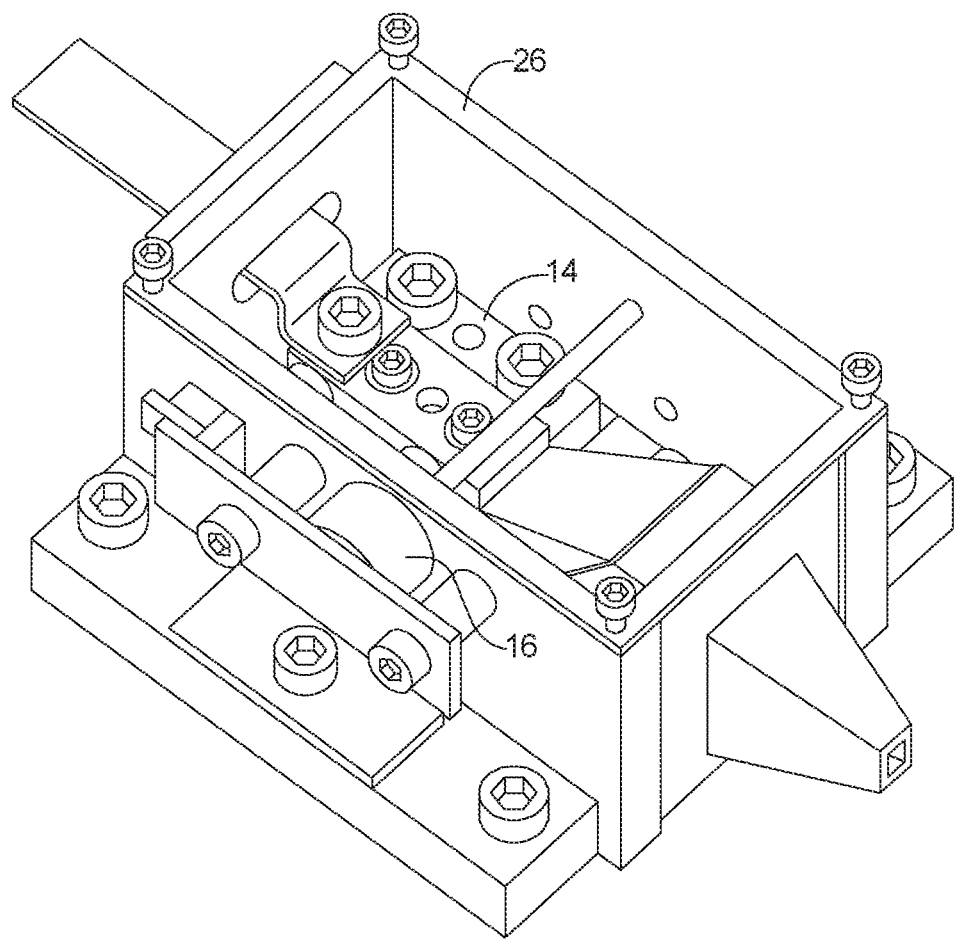
FIG. 2 is a perspective view illustrating a prior art laser diode chamber having a photodiode and an infrared laser diode.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In accordance with an aspect of the present disclosure, closed loop feedback control with a corrected feedback signal that is compensated for background infrared radiation in a laser chamber of a laser welding system is used to control an infrared laser source situated in the laser chamber. In an aspect, the laser source is an infrared laser diode. The laser welding system has an optical sensor situated to sense an intensity of infrared radiation in the laser chamber and provide an output signal to a controller indicative of the sensed intensity. The output signal can be an analog signal or a digitized value depending on optical sensor utilized. In an aspect, the optical sensor is a photodiode. Among other things, the controller controls the infrared laser source. Prior to the infrared laser source being turned on, the controller senses with the optical sensor an intensity of background infrared radiation in the laser chamber. Once the laser is on, the controller senses with the optical sensor an intensity of infrared radiation in the laser chamber. When the infrared laser source is on, the controller controls the infrared laser source using closed-loop feedback control with a corrected feedback signal that compensates for background infrared radiation in the laser chamber. The controller calculates the corrected feedback signal by subtracting the intensity of the background infrared radiation sensed when the infrared laser source was off from the intensity of the infrared radiation sensed when the infrared laser source is on. It should be understood that the intensity of the infrared radiation when the laser source is on is sensed in real-time during when the laser source is on and the corrected feedback signal updated in real-time when the laser source is on. As used herein, "real time" means as fast as the control's closed loop operates, that is, the cycle time of the control's closed loop. By way of example and not of limitation, the cycle times of the control's closed loop used in control of laser welding systems can range from 1 msec. to 1 μsec. and is dependent on characteristics of the laser welding system such as the processing speed of the controller, response time of the feedback sensor, and the like. While this control methodology is described in more detail below with reference to feedback control system 10 of FIG. 1, it should be understood that this control methodology is not in the prior art.

Figure 3:
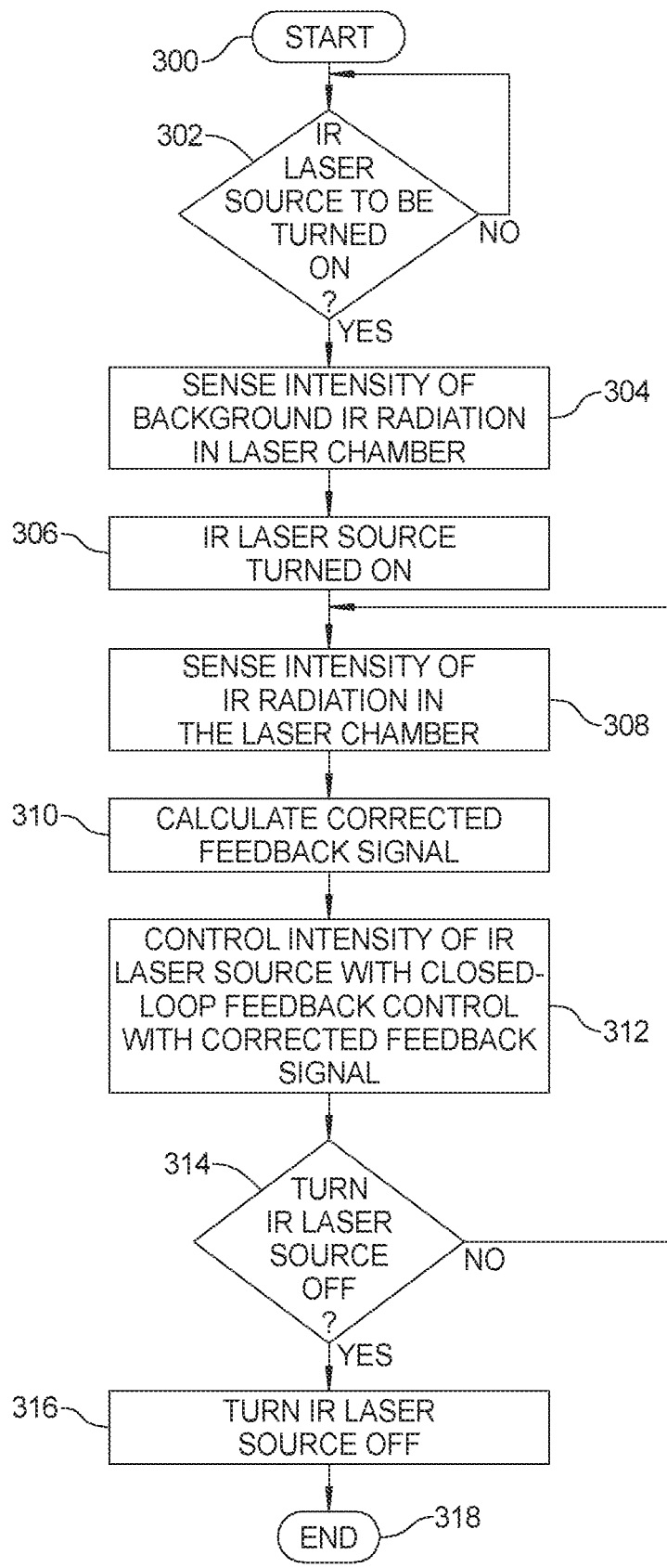
FIG. 3 is a flow chart of a control routine that includes calculation of a corrected feedback signal to compensate for background infrared radiation in a laser chamber in accordance with an aspect of the present disclosure.
Figure 4:
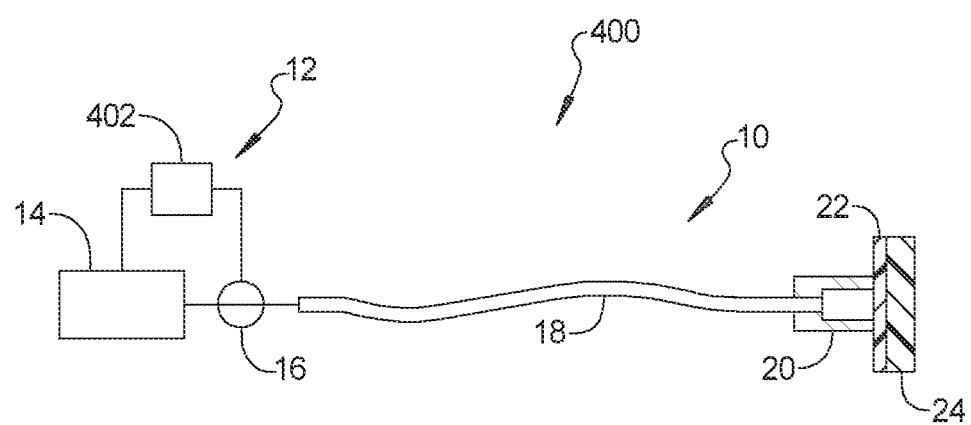
FIG. 4 is a schematic view illustrating a through transmissive infrared welding system using the closed-loop feedback control with corrected feedback signal of FIG. 3.

FIG. 3 is a flow chart of control logic for an example control routine implemented for controlling an infrared laser source situated in a laser chamber of a laser welding system 400 (FIG. 4) in accordance with an aspect of the present disclosure, such as laser source 14 situated in laser chamber 26 where laser source 14 is an infrared laser source. It should be understood that laser welding system 400 is the same as laser welding system 11 with the exception of the control logic for controlling infrared laser source 14 such as described in the following example, which is illustratively implemented in controller 402. The control routine starts at 300. At 302, the control routine checks if infrared laser source 14 is to be turned on. If not, the control routine branches back to 302. If infrared laser source 14 is to be turned on, the control routine proceeds to 304 where before laser source 14 is turned on, controller 17 senses with optical sensor 16 an intensity of background infrared radiation in laser chamber 26 and then proceeds to 306 where infrared laser source 14 is turned on. The control routine then proceeds to 308 where controller 17 senses with optical sensor 16 an intensity of infrared radiation in laser chamber 26 and then proceeds to 310. At 310, controller 17 calculates the corrected feedback signal by subtracting the intensity of the background infrared radiation sensed when the infrared laser source was off from the intensity of the infrared radiation sensed when the infrared laser source is on. The control routine then proceeds to 312 where it controls infrared laser source 14 with closed-loop feedback control with the corrected feedback signal. The control routine then proceeds to 314 where it checks whether infrared laser source 14 is to be turned off. If not, the control routine branches back to 308 and repeats 308-314. In this regard, the corrected feedback signal is updated when 308, 310 are repeated. If at 314 infrared laser source 14 is to be turned off, the control routine proceeds to 316 where infrared laser source 14 is turned off and proceeds to 318 where it ends.

In an aspect, controller 17 senses the intensity of background radiation in laser chamber 26 at a time that is close enough in time to when the infrared laser source is turned on that the sensed intensity of the background radiation will not have materially changed between the time the background radiation is sensed and the time that the infrared laser source is turned on. That is, any change in the sensed intensity of the background radiation between the time it is sensed and the time the infrared laser source is turned on will have a de minimis effect on the calculation of the correct of the feedback signal. In an aspect, the intensity of the background radiation is sensed by controller 17 just before controller 17 turns the infrared laser source on. In an aspect, controller 17 senses the intensity of the background radiation within a time period before the infrared laser source is turned on that is equal to a time period that the infrared laser source is off between when the infrared laser source is turned off in a weld cycle and turned on in the next weld cycle when the laser welding system 11 in running serial production.

The foregoing is advantageously used in welding plastic parts, such as plastic parts 22, 24, in a laser welding system, such as laser welding system 11. The plastic parts are placed in the laser welding system 11. The laser source 14 is then controlled as described above with closed-loop feedback control using a corrected feedback signal as the feedback signal for the closed-loop feedback control. The corrected feedback control signal is determined as described above.

Controllers 17 and 402 can be or includes any of a digital processor (DSP), microprocessor, microcontroller, or other programmable device which are programmed with software implementing the above described logic. It should be understood that alternatively it is or includes other logic devices, such as a Field Programmable Gate Array (FPGA), a complex programmable logic device (CPLD), or application specific integrated circuit (ASIC). When it is stated that controller 17 or 402 performs a function or is configured to perform a function, it should be understood that controller 17 or 402 is configured to do so with appropriate logic (such as in software, logic devices, or a combination thereof). When it is stated that controller 17 or 402 has logic for a function, it should be understood that such logic can include hardware, software, or a combination thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling an infrared laser source situated in a laser chamber of a laser welding system with a controller that uses closed-loop feedback control having a feedback signal, the laser welding system including an optical sensor situated to sense infrared radiation in the laser chamber, the method comprising:
   prior to the infrared laser source being turned on, having the controller sense with the optical sensor an intensity of background infrared radiation in the laser chamber;
   once the laser source is on, having the controller sense with the optical sensor an intensity of infrared radiation in the laser chamber;
   calculating with the controller a corrected feedback signal by subtracting the sensed intensity of the background infrared radiation in the laser chamber when the infrared laser source was off from the sensed intensity of the infrared radiation when the laser source is on; and controlling an intensity of the infrared laser source with the controller when the infrared laser source is on with closed-loop feedback control using the corrected feedback signal as the feedback signal for the closed-loop feedback control.

2. The method of claim 1 wherein each time the infrared laser source is to be turned on, having the controller sense with the optical sensor the intensity of background infrared radiation in the laser chamber just before the infrared laser source is turned on.

3. The method of claim 1 where each time the infrared laser source is to be turned on, having the controller sense with the optical sensor the intensity of background infrared radiation in the laser chamber within a time period before the infrared laser source is turned on wherein the time period is equal to a time period that the infrared laser source is off between when the infrared laser source is turned off in a weld cycle and turned on in a next weld cycle when the laser welding system is running serial production.

4. An infrared laser welding system, comprising:
a laser chamber in which an infrared laser source is situated;
an optical sensor situated to sense an intensity of infrared radiation in the laser chamber;
a controller coupled to the infrared laser source and the optical sensor;
when the infrared laser source is on, the controller configured to control an output intensity of the laser source with closed-loop feedback control with a corrected feedback signal that the controller is configured to calculate; and
the controller configured to calculate the corrected feedback signal by having sensed with the optical sensor an intensity of background infrared radiation in the laser chamber when the infrared laser source was off, sensing with the optical sensor an intensity of infrared radiation in the laser chamber when the infrared laser source is on and calculating the corrected feedback signal by subtracting the sensed intensity of background infrared radiation in the laser chamber when the infrared laser source was off from the sensed intensity of infrared radiation in the laser chamber when the laser source is on.

5. The laser welding system of claim 4 wherein each time the infrared laser source is to be turned on the controller is configured to sense the intensity of background infrared radiation in the laser chamber just before the infrared laser source is turned on.

6. The laser welding system of claim 4 wherein each time the infrared laser source is to be turned on the controller is configured to sense the intensity of background infrared radiation in the laser chamber within a time period before the infrared laser source is turned on wherein the time period is equal to a time period that the infrared laser source is off between when the infrared laser source is turned off toward an end of a weld cycle and turned on toward a beginning of a next weld cycle when the laser welding system is running serial production.

7. A method of welding plastic parts in a laser welding system having an infrared laser source situated in a laser chamber of the laser welding system wherein the infrared laser source is controlled by a controller that uses closed-loop feedback control, the laser welding system including an optical sensor situated to sense infrared radiation in the laser chamber, the method comprising:
placing the plastic parts in the laser welding system;
prior to the infrared laser source being turned on, having the controller sense with the optical sensor an intensity of background infrared radiation in the laser chamber;
having the controller turn the laser source on;
once the laser source is on, having the controller sense with the optical sensor an intensity of infrared radiation in the laser chamber;
calculating with the controller a corrected feedback signal by subtracting the sensed intensity of the background infrared radiation in the laser chamber when the infrared laser source was off from the sensed intensity of the infrared radiation when the laser source is on; and
controlling an intensity of the infrared laser source with the controller when the infrared laser source is on with closed-loop feedback control using the corrected feedback signal as the feedback signal for the closed-loop feedback control.

8. The method of claim 7 wherein each time the infrared laser source is to be turned on, having the controller sense with the optical sensor the intensity of background infrared radiation in the laser chamber just before the infrared laser source is turned on.

9. The method of claim 8 where each time the infrared laser source is to be turned on, having the controller sense with the optical sensor the intensity of background infrared radiation in the laser chamber within a time period before the infrared laser source is turned on wherein the time period is equal to a time period that the infrared laser source is off between when the infrared laser source is turned off in a weld cycle and turned on in a next weld cycle when the laser welding system is running serial production.

* * * * *